(12) United States Patent
Sonnek et al.

(10) Patent No.: US 11,098,663 B2
(45) Date of Patent: Aug. 24, 2021

(54) SYSTEMS AND METHODS FOR DELIVERING FUEL TO AN INTERNAL COMBUSTION ENGINE

(71) Applicant: Hydrolyze, LLC, Lincoln, NE (US)

(72) Inventors: Daniel W. Sonnek, Lake Crystal, MN (US); Patrick E. Spethman, Lincoln, NE (US)

(73) Assignee: Hydrolyze, LLC, Lincoln, NE (US)

( * ) Notice: Subject to any disclaimer, the term of this patent is extended or adjusted under 35 U.S.C. 154(b) by 211 days.

(21) Appl. No.: 16/003,810

(22) Filed: Jun. 8, 2018

(65) Prior Publication Data

US 2019/0285010 A1    Sep. 19, 2019

Related U.S. Application Data

(60) Provisional application No. 62/644,905, filed on Mar. 19, 2018.

(51) Int. Cl.
| | |
|---|---|
| *F02D 41/00* | (2006.01) |
| *F02D 19/02* | (2006.01) |
| *F02M 35/10* | (2006.01) |
| *F02M 37/00* | (2006.01) |
| *F02D 41/30* | (2006.01) |

(52) U.S. Cl.
CPC ....... *F02D 41/0025* (2013.01); *F02D 19/026* (2013.01); *F02D 41/3094* (2013.01); *F02M 35/10216* (2013.01); *F02M 37/0064* (2013.01); *F02M 37/0088* (2013.01); *F02D 2200/0611* (2013.01)

(58) Field of Classification Search
CPC ... Y02T 10/144; F02D 41/36; F02D 41/3094; F02D 41/0025; F02D 19/06; F02D 19/026; F02M 37/0088; F02M 37/0064; F02M 35/10216
See application file for complete search history.

(56) References Cited

U.S. PATENT DOCUMENTS

| | | | | |
|---|---|---|---|---|
| 2,731,803 | A * | 1/1956 | Reed | F17C 13/04 |
| | | | | 137/72 |
| 3,981,321 | A * | 9/1976 | Risse | F02M 37/0052 |
| | | | | 137/255 |
| 5,092,305 | A * | 3/1992 | King | F02D 19/0631 |
| | | | | 123/1 A |

(Continued)

FOREIGN PATENT DOCUMENTS

WO    2015174865    11/2015

*Primary Examiner* — Logan M Kraft
*Assistant Examiner* — Joshua Campbell
(74) *Attorney, Agent, or Firm* — Schwegman Lundberg & Woessner, P.A.

(57) ABSTRACT

An illustrative fuel delivery system for an engine can include a fuel type indicator device and a flow management device. The flow management device can be configured to receive fuel from an auxiliary fuel tank and to direct it based on the type of fuel in the auxiliary fuel tank. If the type of fuel in the auxiliary fuel tank is a primary fuel type (such as diesel or gasoline), the flow management device can deliver the primary fuel to a piston cylinder of the engine. If the type of fuel in the auxiliary fuel tank is an auxiliary fuel (such as a mixture of ethanol and water the flow management device can deliver the auxiliary fuel to an air intake system of the engine.

22 Claims, 4 Drawing Sheets

(56) References Cited

U.S. PATENT DOCUMENTS

| | | | |
|---|---|---|---|
| 7,159,568 B1* | 1/2007 | Lewis | F02D 19/081 |
| | | | 123/299 |
| 7,703,435 B2 | 4/2010 | Surnilla et al. | |
| 8,826,888 B1* | 9/2014 | Kenney | F02B 47/02 |
| | | | 123/25 C |
| 2004/0111210 A1 | 6/2004 | Davis | |
| 2006/0086342 A1* | 4/2006 | Studebaker | F02D 33/003 |
| | | | 123/514 |
| 2007/0119413 A1* | 5/2007 | Lewis | F02M 69/046 |
| | | | 123/295 |
| 2008/0041335 A1* | 2/2008 | Buchwitz | F02B 69/02 |
| | | | 123/304 |
| 2010/0024789 A1* | 2/2010 | Lippa | F02D 19/084 |
| | | | 123/672 |
| 2010/0030451 A1* | 2/2010 | Lippa | F02M 37/0088 |
| | | | 701/104 |
| 2010/0288240 A1 | 11/2010 | Johnston | |
| 2011/0106403 A1* | 5/2011 | Stein | F02D 19/0689 |
| | | | 701/102 |
| 2011/0120569 A1 | 5/2011 | Bromberg et al. | |
| 2011/0288738 A1 | 11/2011 | Donnelly et al. | |
| 2014/0076291 A1* | 3/2014 | Wong | F02D 41/0025 |
| | | | 123/568.11 |
| 2015/0330290 A1* | 11/2015 | Glugla | F02P 15/006 |
| | | | 123/298 |

* cited by examiner

SYSTEMS AND METHODS FOR DELIVERING FUEL TO AN INTERNAL COMBUSTION ENGINE

CLAIM OF PRIORITY

This application claims the benefit of U.S. Provisional Patent Application Ser. No. 62/644,905, filed Mar. 19, 2018, the benefit of priority of which is claimed hereby, and which is incorporated by reference herein in its entirety.

TECHNICAL FIELD

This document pertains generally, but not by way of limitation, to systems and methods for managing fuel flowing to an internal combustion engine. In addition to delivering a primary fuel to an engine, the fuel systems and methods can include delivering an auxiliary fuel to improve engine emissions, performance or operation.

BACKGROUND

Power generation machines such as internal combustion engines can produce emissions, Nitrous Oxides ($NO_x$) emissions are commonly found in diesel engines and have been found to be undesirable for the environment.

To reduce NOx emissions from diesel engines, additional equipment and additives are often required. One method of reducing $NO_x$ emissions in diesel engines is to use selective catalytic reduction. In selective catalytic reduction, ammonia or an ammonia-based reductant is injected into the exhaust system of a diesel engine. The ammonia reacts with the $NO_x$ produced by the engine to convert $NO_x$ into diatomic nitrogen ($N_2$) and water ($H_2O$) in a catalytic converter. While selective catalytic reduction can reduce $NO_x$, the additional equipment required to implement and maintain ammonia-based systems is costly and complex.

Gasoline engines do not have the same $NO_x$ issues as diesel engines since they are operated by spark ignition and gasoline fuel characteristics tend to allow for more complete combustion. However, in some gasoline engine systems, particularly those incorporating supercharger or turbocharger to compress the air, an intercooler may need to be added to the system to reduce the temperature of the compressed air prior to entering the cylinder. Cooling the compressed air improves the volumetric efficiency of the engine, and reduces pre-detonation (e.g., knock).

The disclosed systems and method are directed to overcoming one or more of the problems set forth above.

SUMMARY

Illustrative systems and methods for managing the flow of fuel to an internal combustion engine, and applications of such systems and methods are described herein.

In an illustrative engine system, the system can include an engine having a piston cylinder and an air intake system defining an air intake path. The air intake system can be configured to deliver air to the piston cylinder. A fuel system can supply fuel to the engine system from one of a plurality of fuel tanks.

An illustrative fuel system can include a primary fuel tank and an auxiliary fuel tank. The primary fuel tank can be configured to store the primary fuel. The auxiliary fuel tank can be configured to store either the primary fuel or an auxiliary fuel. The primary fuel and the auxiliary fuel can be different fuels.

The primary fuel can be delivered to a fuel injector of the engine (e.g., piston cylinder). The auxiliary fuel can be delivered to an injection nozzle in fluid communication with the air intake system to deliver the auxiliary fuel into the air intake path.

The fuel system can also include a flow management device in fluid communication with the auxiliary fuel tank. If the auxiliary fuel tank stores the primary fuel, the flow management device can deliver the primary fuel to the piston cylinder. If the auxiliary fuel tank stores the auxiliary fuel, the flow management device can deliver the auxiliary fuel to the injection nozzle in the air intake path.

Another illustrative example described herein includes a method of delivering fuel to an engine. The illustrative method can include delivering a primary fuel of a primary fuel type from a primary fuel tank to a piston cylinder of an engine.

The method can include determining if an auxiliary fuel tank stores the primary fuel type or an auxiliary fuel type. Using the determined fuel type, the method can include delivering either the primary fuel type from the auxiliary fuel tank to the piston cylinder; or delivering the auxiliary fuel type from the auxiliary fuel tank to an injection nozzle in fluid communication with an air intake path.

Another illustrative example described herein includes a fuel delivery system. The illustrative system can include a flow management device, a fuel type indicator device and a controller including processing circuitry, the controller in electrical communication with the flow management device and the fuel type indicator device.

The flow management device can be configured to receive fuel from an auxiliary fuel tank of a plurality of fuel tanks. The fuel type indicator device can be configured to provide a first indication that the auxiliary fuel tank stores a primary fuel, or a second indication that the auxiliary fuel tank stores an auxiliary fuel.

The controller can be configured to receive the first and second indications from the fuel type indicator device to determine what type of fuel is stored in the auxiliary fuel tank. When the controller receives the first indication, the controller can send an instruction to the flow management device to deliver the primary fuel from the auxiliary fuel tank to a piston cylinder of the engine. When the controller receives the second indication, the controller can send an instruction to the flow management device to deliver the auxiliary fuel from the auxiliary fuel tank to an injection nozzle configured to inject the auxiliary fuel into an air intake path.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
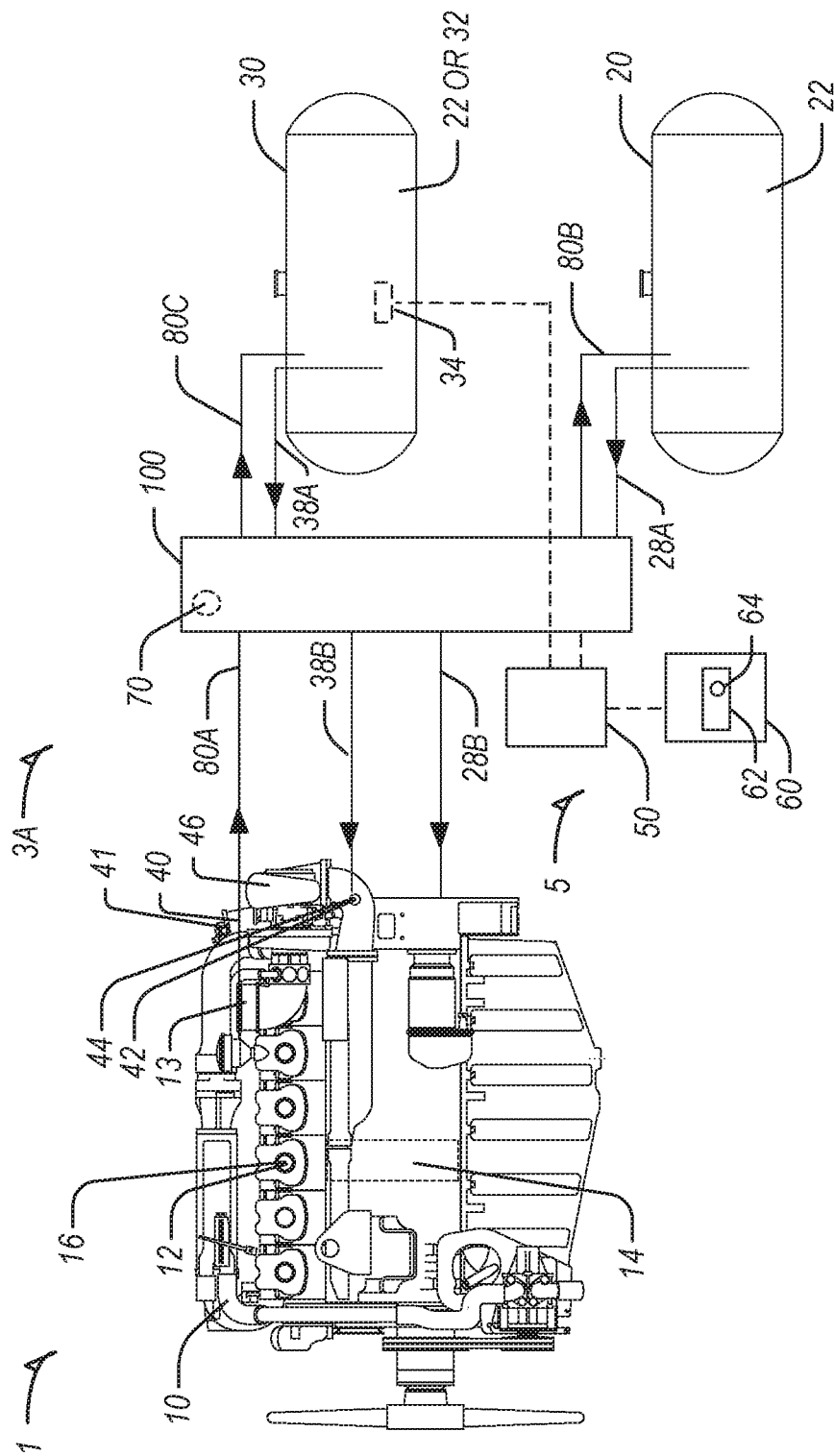
FIG. 1 is a diagram of an illustrative engine system and fuel system, in accordance with at least one example.

As previously described, nitrogen oxides ($NO_x$) present in exhaust from internal combustion engines, especially diesel engines, can be undesirable for the environment. One of the methods to reduce $NO_x$ emissions is to treat emissions produced by an engine using an exhaust treatment system. However, rather than treating the exhaust produced by an engine, the systems and methods described herein are directed to reducing the amount of $NO_x$ produced during combustion.

To reduce the production of $NO_x$, the systems and methods include managing the flow of fuel to the engine system to reduce the amount of $NO_x$ emissions produced. The systems and methods can also improve engine performance and operation cooling air flowing into a piston cylinder of the engine.

The fuel systems and flow management devices and methods described herein can be applied to a variety of internal combustion engines. The fuel systems and flow management devices can be implemented as part of the original equipment manufacturing (OEM), or as an aftermarket add-on system.

The fuel and flow management systems can be used with, for example, a vehicle such as a semi-truck having an engine and a plurality of fuel tanks. Some semi-trucks include two saddle tanks located on opposite sides of the truck (though a variety of other arrangements are also known). Generally, the two saddle tanks of a semi-truck are similar to each other and are configured to carry the same fuel, usually diesel. The reason for providing two fuel tanks is to extend the range that the semi-truck can travel between stops to re-fuel.

Although some examples described herein are described with reference to diesel engines, the features described may also be used with other types of internal combustion engines, including gasoline engines. When used with gasoline engines, the fuel and flow management systems can improve volumetric efficiency and reduce or eliminate pre-detonation (e.g., knock).

As described herein, the term fluidly coupled can be defined as the fluid contents of two or more components being in fluid communication with each other. In other words, fluidly coupled can include a mechanical coupling that allows communication of fluids, including, liquids and gaseous substances, within and between components. For example, the contents (or a portion of the contents) of a first component, can be "in fluid communication" with the contents (or a portion of the contents) of a second component.

Fuel, as described herein can include various fluids delivered to an engine to be combusted, or to support the process of combustion. Fuel can include but is not limited to, diesel, gasoline, ethanol, and water, as well as combinations thereof.

References to any primary elements or auxiliary elements described herein are merely for convenience, and do not necessarily indicate a priority. Although in some examples, the use of primary and auxiliary terms can indicate a priority. Instead of primary and auxiliary, terms such as "first and "second" can also be used.

FIG. 1 shows an engine system 1 and a fuel system 3A. The engine system 1 can include an engine 10 having a piston cylinder 14 and an air intake system 40. The fuel system 3A can include a plurality of fuel tanks 20, 30 and a flow management device 100. The flow management device 100 can be fluidly coupled to at least one of the plurality of fuel tanks 20, 30 to control the flow of fuel from at least one of the plurality of fuel tanks 20, 30 to the engine 10.

As shown in FIG. 1, the engine 10 can be an internal combustion engine, such as, but not limited to, a diesel or gasoline engine. The engine 10 can generate power by combusting fuel delivered to the piston cylinder 14 from one or more of the plurality of fuel tanks 20, 30.

The plurality of fuel tanks 20, 30 can include a primary fuel tank 20 and an auxiliary fuel tank 30. The primary fuel tank 20 (hereinafter, primary tank 20) and the auxiliary fuel tank 30 (hereinafter, auxiliary tank 30) can be identical, similar, or different from one another. In some examples, the primary and auxiliary tanks can be the same size, however, they may also be different sizes. In another example, the plurality of fuel tanks 20, 30 can include a single tank having a divider to separate the single tank into two fuel tanks.

The primary tank 20 can be configured to store a first type of fuel (hereinafter, primary fuel 22) for delivery to a primary location 12 of the engine system 1. In the example, the primary location 12 can include the piston cylinder 14. The primary fuel 22 can be injected into the piston cylinder 14 by a fuel injector 16.

The example of FIG. 1 is described with respect to the primary fuel 22 being diesel fuel and the primary tank 20 configured to store diesel fuel. However, in some alternate examples, the primary tank 20 can store gasoline, fuel blends, flex fuels, bio fuels, or another fuel or fluid.

The auxiliary tank 30 can be configured to store multiple types of to be supplied to different parts of the engine system 1 depending on the fuel type being stored. In the example, both the primary tank 22 and the auxiliary tank 30 can be configured to store the primary fuel 22. In addition, the auxiliary fuel tank 30 can also be configured to store a second type of fuel 32 (hereinafter, auxiliary fuel 32) for delivery to the engine system 1.

The auxiliary fuel 32 can include a fuel such as ethanol and/or water. In some examples, the auxiliary fuel 32 can include low-proof ethanol, a mixture of ethanol and water, or water (without ethanol). Low-proof ethanol can be defined as being in a range of about 130-190 proof ethanol. Other ethanol proof levels can be used. In some examples the range of 130-190 proof can be beneficial because it prevents freezing over a range of temperatures, yet it is more cost-effective than high proof ethanol. High proof ethanol can be described as being in a range of about 190-200 proof ethanol. High proof ethanol can be expensive to produce as compared to lower proof ethanol. One of the reasons that high proof ethanol is more expensive than low proof ethanol is that to remove the last bit of water or other fluids from the ethanol to get from 190 proof to 200 proof is a more expensive process. Also, the distilled water produced by the ethanol process is not only safe to inject into the engine but also can have a greater effect on the reduction of NOx. In some examples, purified water can be used without ethanol, however there is a risk of the water freezing. Other auxiliary fuels (e.g., fuels or other fluids, ethanol alternatives) that can improve emissions or operation can also be used as the auxiliary fuel 32. Unless described otherwise, the term "about" in reference to the ethanol proof includes the range specified and a range of ±15% of the range specified.

The flow management device 100 can be configured to be in fluid communication with the auxiliary tank 30 and the engine 10 to control the flow of fuel (22 or 32) from the auxiliary tank 30 to the engine system 1. The flow management device 100 can deliver the fuel stored in the auxiliary tank 30 to different locations of the engine system 1, depending on whether the auxiliary tank 30 stores the primary fuel 22 or the auxiliary fuel 32.

The flow management device 100 can be configured in a variety of different arrangements to control the flow of fuel in the fuel system 3A. An example flow management device 100 is shown in FIG. 1. The flow management device 100 can include any flow management components such as valves and pumps, but can also include components such as solenoids, seals and actuators. The flow management device 100 can be arranged in fluid communication with the engine system 1 and with one or more of the fuel tanks 20, 30 via fuel lines (28A, 28B, 38A, 38B, 80A, 80B, 80C). The fuel lines will also be described in additional detail in the example of FIG. 2.

If the auxiliary tank 30 contains the primary fuel 22, the flow management device 100 can deliver the primary fuel 22 via the auxiliary fuel line 38A into the primary fuel line 28B. As described, the primary location 12 can include a fuel injector 16 for injecting the primary fuel 32 into the piston cylinder 14. In other examples, the fuel injector 16 can inject the primary fuel 22 into an intake manifold 13 that is immediately upstream of and in fluid communication with the piston cylinder 14.

If the auxiliary tank 30 contains the auxiliary fuel 32, the flow management device 100 can deliver the auxiliary fuel 32 to an auxiliary location 42. The auxiliary location 42 can be located along the air intake system 40. The air intake system 40 can have an air intake path extending between air intake 41 and intake manifold 13 to supply fresh air to the engine 10. The auxiliary location 42 can include an injection nozzle 44 configured to inject the auxiliary fuel 32 into the air intake path (e.g., between 41 and 13).

In some examples, the air intake system 40, can include an air compression device 46 such as a turbocharger or supercharger. Providing an air compression device 46 can improve the efficiency and power output of the engine 10 by forcing extra air into the combustion chamber (e.g., piston cylinder 14). In the example, the auxiliary location 42 is positioned downstream of the air compression device 46 and upstream of the intake manifold 13. In some examples, the auxiliary location 42 can be positioned along a different portion of the air intake system 40. For example, the auxiliary location 42 can be positioned along the intake manifold 13 to inject the auxiliary fuel into the intake manifold 13. In an alternate example, the auxiliary location 42 can be positioned such that the auxiliary fuel is injected directly into the piston cylinder 14. Downstream can be defined as being downstream in the direction of air flow to the engine.

One benefit of injecting an auxiliary fuel 32 such as low proof ethanol into the air intake system 40 downstream of the air compression device 46 is that the low proof ethanol evaporates due to the elevated temperatures of the compressed air. In turn, the evaporating low proof ethanol cools the compressed air (e.g., acts like an intercooler). This allows for more air to be passed into the air compression system 46 because the specific volume of the air is reduced, and therefore there is less backpressure on the air compression system 46.

In the engine 10, the low-proof ethanol vapor mixes with the compressed diesel fuel and air to reduce the pre-ignition characteristics (knocking) of the engine 10 and increase efficiency. In other words, the injection of low-proof ethanol causes water in the low proof ethanol to expand and turn into steam, and also reduces the exhaust temperature. The production of $NO_x$ is decreased because the water vapor reduces the flame temperature in the combustion cycle and the ethanol acts as an oxygenate. In addition, the amount of diesel used by the engine 10 can also be reduced due to the energy input of the low-proof ethanol.

With continued reference to FIG. 1, a control system 5 (also shown in FIGS. 2 and 3) can include a controller 50 in electrical communication with the flow management device 100 (or 200, FIG. 2) and at least one of a user input 60 device or a fuel sensor 34. The controller 50 can include processing circuitry 52 (FIG. 3) configured to determine the fuel type in the auxiliary tank 30 and to control the flow of fuel from the auxiliary tank 30 based on the fuel type. As used herein the controller may be embodied by control circuitry, control systems or subsystems, control modules, or control logic hardware.

When the auxiliary tank 30 is storing auxiliary fuel 32, the rate of delivery of the auxiliary fuel 32 can be based, at least in part, on the throttle position of the primary fuel 22 being delivered to the engine 10 from the primary tank 20. Therefore, in some examples, the controller 50 can control the flow of fuel from both the auxiliary tank 30, as well as the primary tank 20.

To control the flow of fuel, the controller 50 can be configured to receive, send and process information. For example, the controller 50 can receive an indication from a fuel sensor 34 disposed in the auxiliary tank 30, and can send an instruction (such as a signal or command) to the flow management device 100 to control the flow of fuel to the engine 10. The controller 50 can be separate from the flow management device 100, or can be integral to the flow management device 100. In some examples, the controller 50 can control other components of the engine system 1.

The fuel sensor 34 or user input 60 can provide the controller 50 an indication of the type of fuel is in the auxiliary tank 30. An example of a fuel sensor 34 can include any type of sensor that can indicate the type of fuel that is stored in the auxiliary tank 30. Suitable fuel sensors 34 can include, but are not limited to, conductivity and mass sensors. In sonic examples, the fuel sensor 34 can be configured to determine if the auxiliary tank 30 contains diesel fuel or ethanol fuel. In other examples, the fuel sensor 34 can be configured to determine if the auxiliary tank 30 contains gasoline fuel or ethanol fuel. The fuel sensor 34 is not limited to the fuels listed, as the fuel sensor 34 can be configured to detect, indicate, and communicate other types of fuels.

Instead of, or in addition to, determining the type of fuel with the fuel sensor 34, the user input 60 can include an actuator 64 associated with a user interface 62, such as an electrical switch or an input element on a touch screen display. The user can indicate, via the user interface 62, if the auxiliary tank 30 stores the primary fuel 22 or the auxiliary fuel 32. The user input 60 can send the user's indication to the controller 50.

When the controller 50 receives a first indication from the fuel sensor 34 or user input 60 that the auxiliary tank 30 stores the primary fuel 22, the controller 50 can cause the flow management device 100 to deliver the primary fuel 22 from the auxiliary tank 30 to the primary location 12. In some examples, delivering the primary fuel 22 to the primary location 12 can include injecting the primary fuel 22 into the piston cylinder 14 via a fuel injector 16.

Any excess primary fuel 22 that is sent to the primary location 12 that is not needed by the engine 10, whether delivered from the primary tank 20 or the auxiliary tank 30, can be returned to the primary tank 20 or the auxiliary tank 30. For example, unused primary fuel 22 can be returned through return line 80A (e.g., return rail), and can then be diverted by the flow managing device 100 to flow into either the primary tank 20 via line 80B, or the auxiliary tank 30 via line 80C.

When the controller 50 receives a second indication from the fuel sensor 34 or user input 60 that the auxiliary tank 30 stores the auxiliary fuel 32, the controller 50 can send an instruction to the flow management device 100 to deliver the auxiliary fuel 32 from the auxiliary tank 30 to the auxiliary location 42. The auxiliary location 42 can include an injection nozzle 44 fluidly coupled to air intake system 40. In some examples, delivering the auxiliary fuel 32 to the auxiliary location 42 can include injecting the auxiliary fuel 32 into the air intake path (e.g., between air intake 41 and the engine 10).

Figure 2:
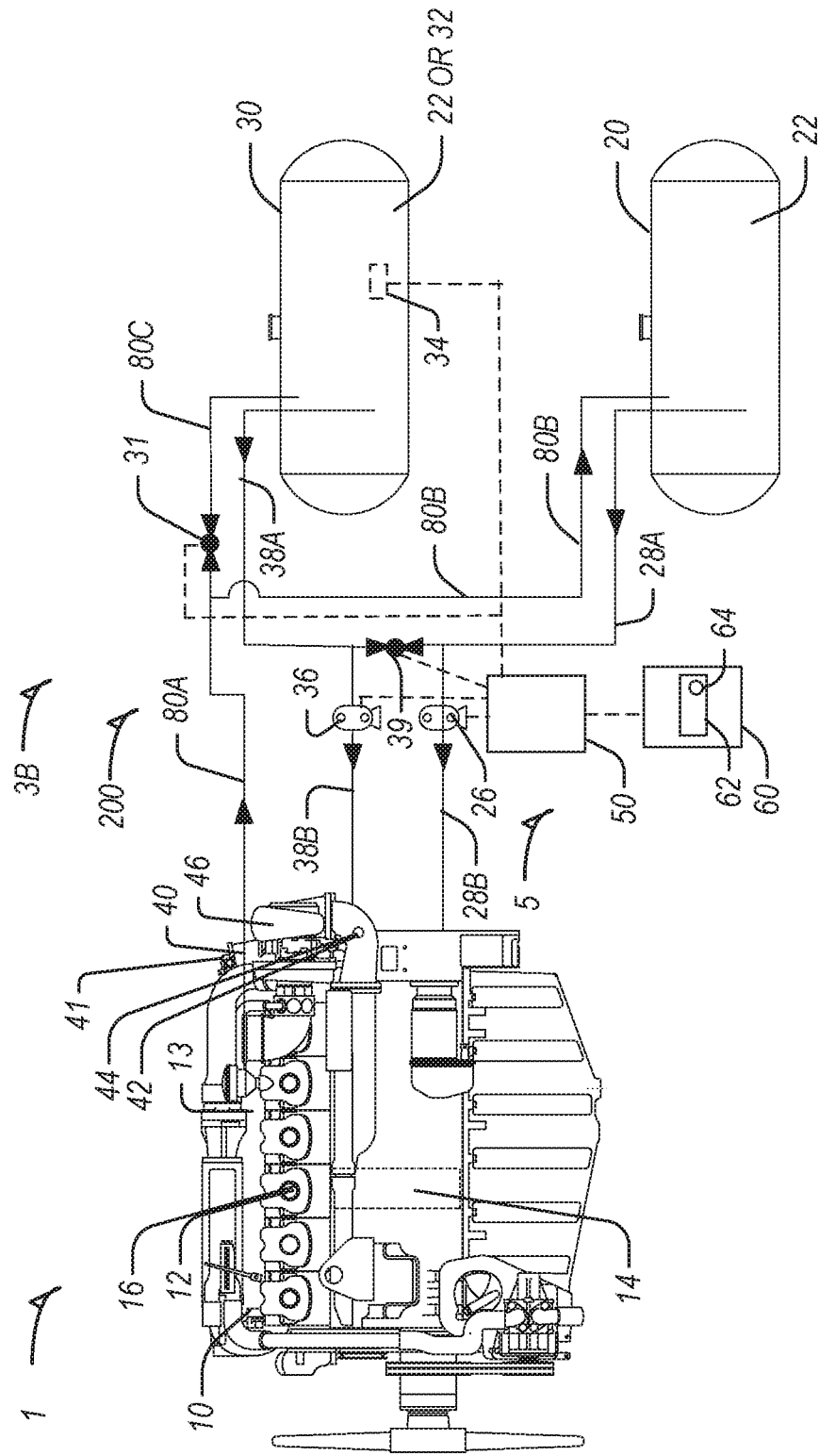
FIG. 2 is diagram of the engine system of FIG. 1 and another illustrative fuel system, in accordance with at least one example.

In some examples, the controller 50 can also be in electrical communication with a primary fuel pump 26 (e.g., shown in the example of FIG. 2). The primary fuel pump 26 can be in fluid communication with the primary tank 20 and can be configured to deliver the primary fuel to the primary location 12.

In an alternate example, the fuel system 3A can include two auxiliary tanks 30. Instead of the fuel system 3A including a primary fuel tank 20 and an auxiliary fuel tank 30, the fuel system 3A can include two auxiliary tanks 30. In this example, the flow management device 100 can be configured to operate both tanks 20, 30 as auxiliary tanks 30. This can increase the flexibility of the fuel system 3A by allowing a user to store the primary fuel 22 or the auxiliary fuel 32 in either of tanks 20 and 30, as desired.

The engine system 1 and the fuel system 3A can be assembled together during manufacturing. However, all or a portion of the fuel system 3A can be added as an aftermarket product for an existing vehicle or power generation system.

Numerous variations based on the example of FIG. 1 can be provided to accomplish the function of FIG. 1. For example, instead of, or in addition to the controller 50 receiving an electrical type of user input 60 from the user interface 62 or the fuel sensor 34, the indication of fuel type in the auxiliary tank 30 can be delivered to the flow management device 100 by a mechanical user input 70. The mechanical user input 70 can be operated by a user to control a valve to direct or divert the flow of fuel from the auxiliary tank 30 to either the primary location 12 or the auxiliary location 42. The mechanical user input 70 can be any type of flow management device and is not limited to purely mechanical devices. Other flow management devices, including electromechanical, electronic, and electromagnetic devices, can be used.

FIG. 2 shows an engine system 1 and a control system 5 that are similar to the example of FIG. 1, and another example of a fuel system 3B including a more detailed example of a flow management device 200. For the sake of brevity, like numerals in FIGS. 1 and 2 can represent like elements, and therefore, may not be described in further detail in FIG. 2.

In the example flow management device 200, one or more valves and pumps can be arranged to deliver the fuel in the auxiliary tank 30 to either the primary location 12 or to the auxiliary location 42. The flow management device 200 can perform the same or similar functions as the flow management device 100 of FIG. 1.

In the example of FIG. 2, the flow management device 200 can fluidly couple the primary fuel tank 20 to the engine system 1 via primary fuel lines 28A, 28B. The flow management device 200 can also couple the auxiliary fuel tank 30 to the engine system 1 via auxiliary fuel lines 38A, 38B. The flow management device 200 can be controlled by the controller 50 (described with FIG. 1) to direct fuel stored in the auxiliary tank 30 to either the primary location 12 or auxiliary location 42, depending on the type of fuel 22 or 32 in the auxiliary tank 30.

The flow management device 200 can include a primary fuel pump 26 and an auxiliary fuel pump 36, an auxiliary return valve 31, and an auxiliary diversion valve 39.

The primary fuel pump 26 can deliver the primary fuel 22 stored in the primary tank 20 to the piston cylinder 14 via primary fuel line 28A, 28B. When the auxiliary tank 30 also stores the primary fuel 22, the primary pump 26 can deliver the primary fuel 22 from the auxiliary tank 30 to the piston cylinder 14 as well.

If it is determined that the auxiliary tank 30 also stores the primary fuel 22, then the auxiliary diversion valve 39 can be opened to allow the flow of the primary fuel 22 stored in the auxiliary tank 30 to the piston cylinder 14. In this example, the primary fuel 22 in the auxiliary tank 30 can enter the auxiliary fuel line (portion 38A), passing through the auxiliary diversion valve 39 and into the primary fuel line (portion 28B) which delivers the primary fuel 22 to the piston cylinder 14.

In contrast, if it determined that the auxiliary tank 30 contains the auxiliary fuel 32, the auxiliary diversion valve can be closed to prevent the flow of fuel from the auxiliary tank 30 into the primary fuel line 28A, 28B and to the piston cylinder 14. With the diversion valve 39 in the closed position, the auxiliary fuel 32 is prevented from flowing into the primary fuel line (portion 28B), instead, the auxiliary fuel 32 can flow through the auxiliary fuel line 38A, 38B and can be delivered to the auxiliary location 42. At the auxiliary location 42, the auxiliary fuel 32 can be injected into the air intake path (e.g., at 42).

Any unused primary fuel sent to the primary location 12, whether delivered from the primary tank 20 or the auxiliary tank 30, can be returned to the primary tank 20 or the auxiliary tank 30 via a main return line 80A. The auxiliary return valve 31, when closed, causes the unused primary fuel 22 to return to the primary tank 20 via a primary return line 80B. When the auxiliary return valve 31 is open, the unused primary fuel 22 is returned to the auxiliary tank 30 via auxiliary return line 80C.

Figure 3:
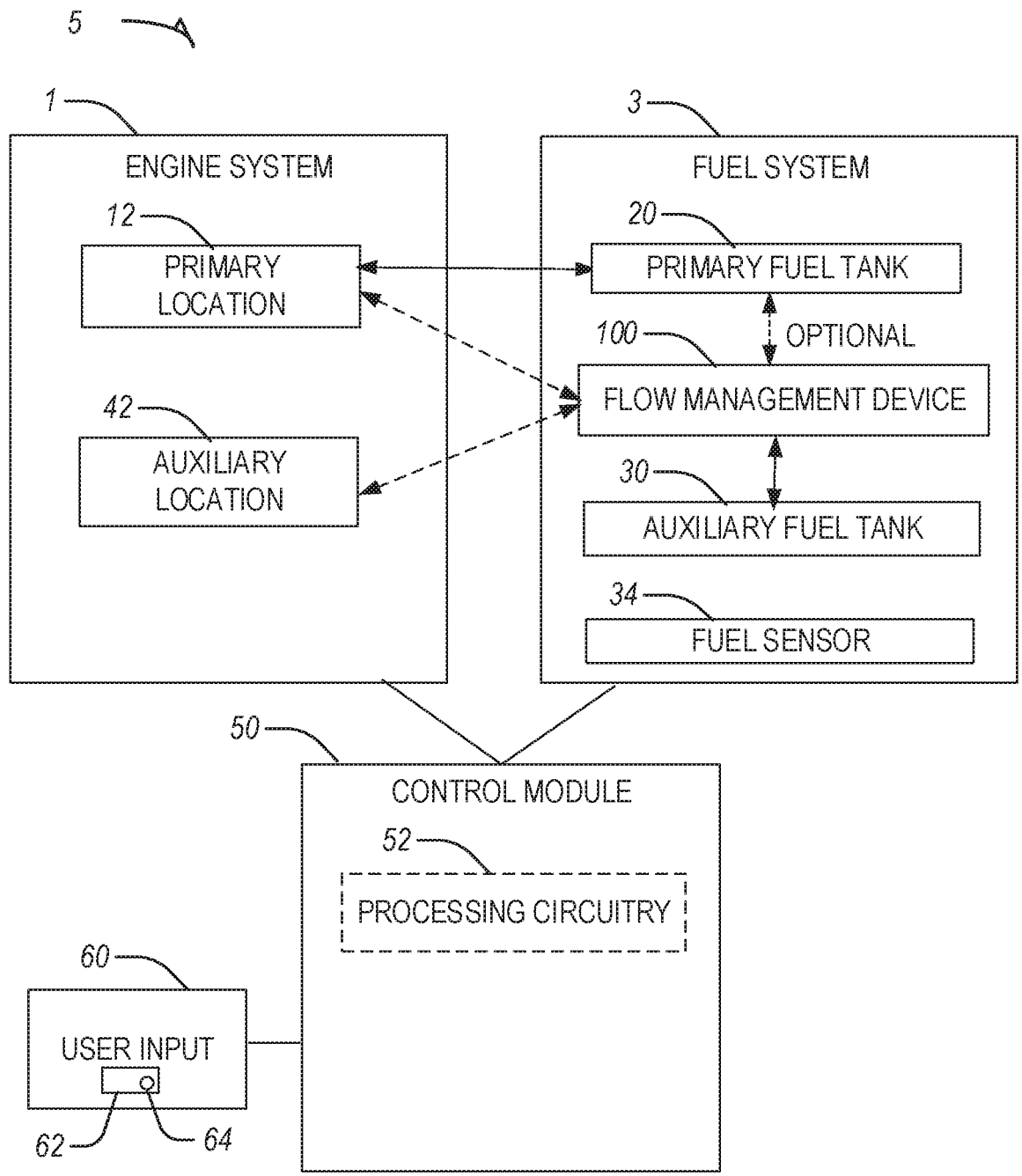
FIG. 3 is a diagram of a control system that can be used with the engine system and fuel systems of FIGS. 1 and 2, in accordance with at least on example.
Figure 4:
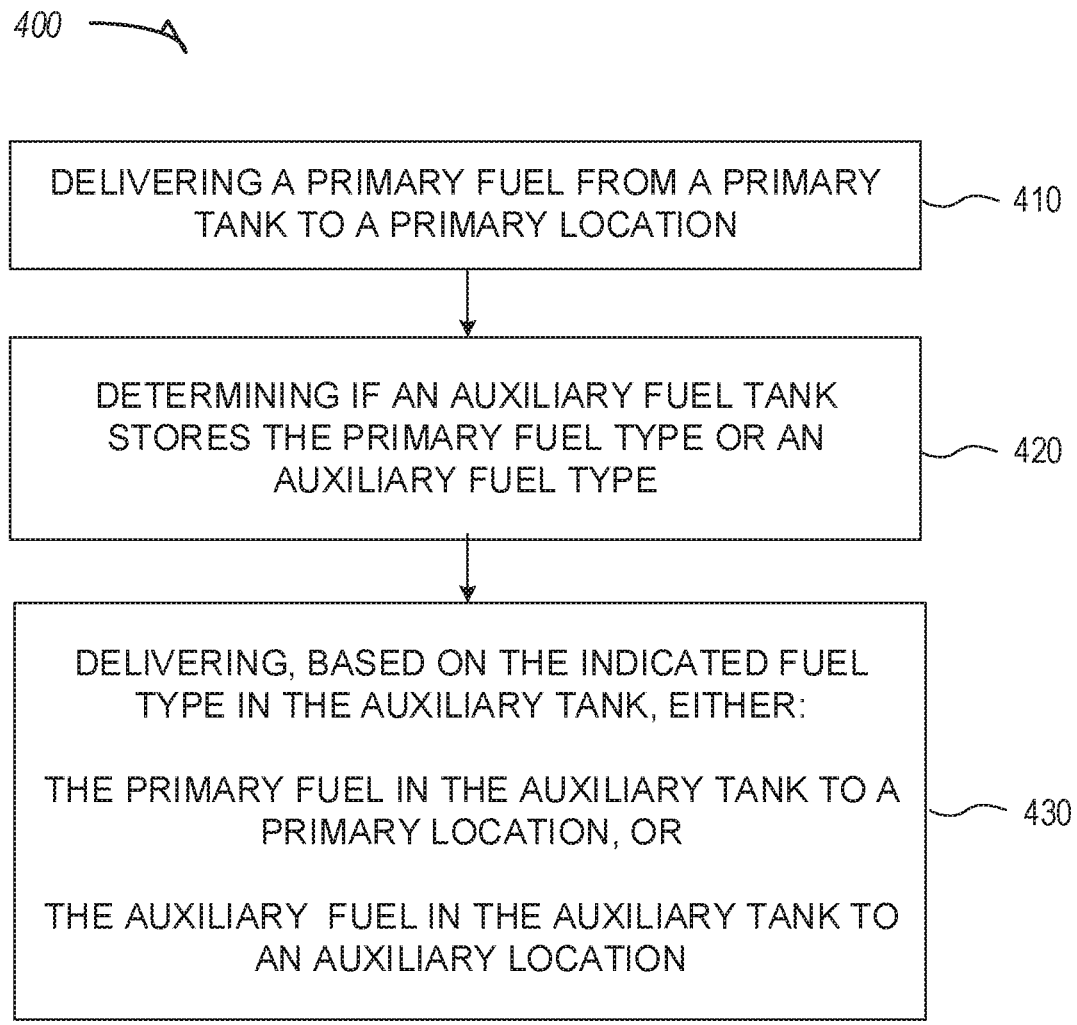
FIG. 4 is a method of delivering fuel to an engine that can be used with the systems of FIGS. 1-3, in accordance with at least one example.

FIG. 4 shows an illustrative method 400 for managing delivery of fuel to an engine 10 using the illustrative flow management devices 100, 200 and control system 5 of FIGS. 1-3, in accordance with at least one example. The illustrative method 400 can result in a reduction of $NO_x$ in emissions and improved engine performance and operation.

The method 400 can be used with the flow management devices 100, 200 and control system 5 described herein, but can also be used with other flow management devices and control systems. Alternatively, the flow management systems and controls systems described herein can also be used with other methods 400.

Operation 410 of the method 400 can include delivering a primary fuel from a primary tank to a primary location. In some examples, the primary location can include the piston cylinder of an engine. In some examples, operation 410 can include sending a command from a controller to a delivery device in electrical communication with the controller to deliver the primary fuel from the primary tank to the primary location.

Operation 420 can include determining if an auxiliary tank stores the primary fuel type or an auxiliary fuel type. Operation 420 can be performed using a control system including the controller having processing circuitry. The controller can be in electrical communication with a fuel sensor and a flow management device to control the flow of fuel from the auxiliary tank.

An example determining operation 420 can include generating, with the fuel sensor (e.g., disposed in or associated with the auxiliary tank), fuel type indication corresponding to the fuel type in the auxiliary fuel tank. The determining operation 420 can further include receiving, at the controller, the fuel type indication, and determining, with the controller, whether the fuel type indication corresponds to the primary fuel type or the auxiliary fuel type.

Operation 430 can include delivering, based on the determined fuel type in the auxiliary tank, either the primary fuel in the auxiliary tank to a primary location; or an auxiliary fuel in the auxiliary tank to an auxiliary location. In some examples, the primary location can include a fuel injector that supplies fuel to a piston cylinder. The auxiliary location can include an injection nozzle that is in fluid communication with an air intake path.

In operation 430, if the controller determines that the auxiliary tank stores the primary fuel type, the controller can send an instruction to the flow management device to deliver the primary fuel to the primary location. And, in operation 430, if the controller determines that the auxiliary tank stores the auxiliary fuel type, the controller can send an instruction to the flow management device to deliver the auxiliary fuel to the second location.

Any or all of the operations of method 400 can be used on-board a vehicle (e.g., cars, trucks, recreational vehicles, construction equipment, snowmobiles, boats, ships, etc.). The method 400 can also be used in other systems having internal combustion engines or other sources that produce $NO_x$ or other emissions, such as power generation systems, including but not limited to, mobile power generation, and tools that include gas internal combustion engines, especially diesel engines.

In an example, the control system 5 can include a machine-readable medium to perform, control, monitor, or cause any of the steps of the method 400. In an example, the term "machine readable medium" can include a single medium or multiple media (e.g., a single or multiple memory devices) configured to store one or more instructions (e.g., firmware, programmable logic, etc.). Accordingly, the term "machine readable medium" can include any medium that is capable of storing, encoding, or carrying instructions for execution by a machine, and that cause the machine to perform any one or more of the techniques of the present disclosure or that is capable of storing, encoding or carrying data structures used by or associated with such instructions. Non-limiting machine readable medium examples can include solid-state memories, non-volatile memory such as semiconductor memory devices (e.g., Electrically Programmable Read-Only Memory (EPROM), Electrically Erasable Programmable Read-Only Memory (EEPROM)) and flash memory devices; and other forms of embedded, programmable, or configurable circuitry.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and 13," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. An engine system comprising:
    an engine including a piston cylinder;
    an air intake path configured to deliver air to the piston cylinder;
    a primary tank configured to store a primary fuel, the primary tank in fluid communication with a piston cylinder injection nozzle to deliver fuel to the piston cylinder;
    an auxiliary tank configured to store the primary fuel or an auxiliary fuel that is a different fuel type than the primary fuel;
    an auxiliary injection nozzle selectably in fluid communication with the auxiliary tank, the auxiliary injection nozzle located upstream of the piston cylinder injection nozzle; and
    a flow management device in fluid communication with the primary tank and the auxiliary tank,
    wherein the flow management device is configured to allow delivery of the primary fuel in the primary tank to the piston cylinder injection nozzle and to disallow delivery of the primary fuel to the auxiliary injection nozzle, wherein the flow management device receiving a first indication that the auxiliary tank stores the primary fuel causes the flow management device to allow delivery of the primary fuel to the piston cylinder injection nozzle, allow return of excess primary fuel back to the auxiliary tank, and disallow delivery of the primary fuel to the auxiliary injection nozzle, and wherein the flow management device receiving a second indication that the auxiliary tank stores the auxiliary fuel causes the flow management device to allow delivery of the auxiliary fuel to the auxiliary injection nozzle and disallow delivery of the auxiliary fuel to the piston cylinder injection nozzle.

2. The system of claim 1, wherein the primary fuel comprises at least one of diesel or gasoline, and the auxiliary fuel comprises ethanol.

3. The system of claim 2, wherein the auxiliary fuel comprises an ethanol and water mixture.

4. The system of claim 2, wherein the auxiliary fuel comprises between 130 and 190 proof ethanol.

5. The system of claim 1, further comprising:
an air compression device in the air intake path, wherein the auxiliary injection nozzle is configured to inject the auxiliary fuel into the air intake path downstream of the air compression device and upstream of an intake manifold.

6. The system of claim 2, further comprising:
a controller including processing circuitry in electrical communication with a fuel sensor and the flow management device,
wherein the fuel sensor is configured to sense if the type of fuel in the auxiliary tank is the primary fuel or the auxiliary fuel,
wherein if the controller receives the first indication from the fuel sensor that the auxiliary tank stores the primary fuel, the controller causes the flow management device to deliver the primary fuel to the piston cylinder injection nozzle, and
wherein if the controller receives the second indication from the fuel sensor that the auxiliary tank stores the auxiliary fuel, the controller sends an instruction to the flow management device to deliver the auxiliary fuel to the auxiliary injection nozzle.

7. The system of claim 2, further comprising:
an actuator in electrical communication with the flow management device, wherein the actuator is configured to receive an input from a user that indicates if the auxiliary tank stores the primary fuel or the auxiliary fuel.

8. The system of claim 1, wherein if the auxiliary tank stores the auxiliary fuel, the flow management device disallows return of auxiliary fuel back to the auxiliary tank or the primary tank.

9. The system of claim 1, wherein the flow management device includes:
a plurality of valves;
a primary pump to cause a flow of the primary fuel;
an auxiliary pump to cause a flow of the auxiliary fuel, and
one or more fuel lines connected to the plurality of valves, the primary pump and the auxiliary pump,
wherein the plurality of valves includes:
an auxiliary diversion valve configured to be in fluid communication with the auxiliary tank via at least one of the one or more fuel lines, the auxiliary diversion valve having an open position and a closed position,
wherein the auxiliary diversion valve in the open position allows a flow of primary fuel from the auxiliary tank to the piston cylinder injection nozzle and disallows the flow of primary fuel from the auxiliary tank to the auxiliary injection nozzle,
wherein the auxiliary diversion valve in the closed position allows a flow of auxiliary fuel from the auxiliary tank to the auxiliary injection nozzle and disallows the flow of auxiliary fuel from the auxiliary tank to the piston cylinder injection nozzle, and
an auxiliary return valve configured to be in fluid communication with the auxiliary tank via at least one of the one or more fuel lines, the auxiliary return valve having an open position and a closed position,
wherein the auxiliary return valve in the open position allows excess primary fuel that was delivered to the piston cylinder injection nozzle to return to the auxiliary tank,
wherein the auxiliary return valve in the closed position disallows excess primary fuel that was delivered to the piston cylinder injection nozzle from returning to the auxiliary tank.

10. A fuel management system for managing fuel delivery to a machine, the machine including an engine, a primary fuel tank and an auxiliary fuel tank, the engine having a piston cylinder, a piston cylinder injection nozzle and an air intake path, the air intake path configured to deliver air to the piston cylinder, the piston cylinder injection nozzle configured to deliver fuel into the piston cylinder, the primary fuel tank configured to store a primary fuel, the auxiliary fuel tank configured to store the primary fuel or an auxiliary fuel, the system comprising:
an auxiliary injection nozzle configured to be coupled to the air intake path to deliver the auxiliary fuel to the air intake path upstream of the piston cylinder injection nozzle; and
a flow management device configured to fluidly couple the primary fuel tank to the piston cylinder injection nozzle and selectably fluidly coupled the auxiliary fuel tank to either the piston cylinder injection nozzle or the auxiliary injection nozzle,
wherein the flow management device is configured to allow delivery of the primary fuel in the primary fuel tank to the piston cylinder injection nozzle and to disallow delivery of the primary fuel to the auxiliary injection nozzle,
wherein the flow management device receiving a first indication that the auxiliary fuel tank stores the primary fuel causes the flow management device to allow delivery of the primary fuel to the piston cylinder injection nozzle, disallow delivery of the primary fuel to the auxiliary injection nozzle, and allow excess primary fuel that was delivered to the piston cylinder injection nozzle to return to the auxiliary fuel tank, and
wherein the flow management device receiving a second indication that the auxiliary fuel tank stores the auxiliary fuel causes the flow management device to allow delivery of the auxiliary fuel to the auxiliary injection nozzle, and disallow delivery of the auxiliary fuel to the piston cylinder injection nozzle.

11. The system of claim 10, wherein if the auxiliary fuel tank stores the auxiliary fuel, the flow management device disallows return of auxiliary fuel back to the auxiliary fuel tank or the primary fuel tank.

12. The system of claim 10, wherein the flow management device includes a mechanical user input, operable by a user, to receive the first indication or the second indication.

13. The system of claim 10, wherein the flow management device includes:
a plurality of valves;
a primary pump to cause a flow of the primary fuel;
an auxiliary pump to cause a flow of the auxiliary fuel; and
one or more fuel lines connected to the plurality of valves, the primary pump and the auxiliary pump,
wherein the plurality of valves includes:
an auxiliary diversion valve configured to be in fluid communication with the auxiliary fuel tank via at least one of the one or more fuel lines, the auxiliary diversion valve having an open position and a closed position,
wherein the auxiliary diversion valve in the open position allows a flow of primary fuel from the auxiliary fuel tank to the piston cylinder injection nozzle and disallow the flow of primary fuel from the auxiliary fuel tank to the auxiliary injection nozzle,
wherein the auxiliary diversion valve in the closed position allows a flow of auxiliary fuel from the auxiliary fuel tank to the auxiliary injection nozzle and disallows the flow of auxiliary fuel from the auxiliary fuel tank to the piston cylinder injection nozzle; and
an auxiliary return valve configured to be in fluid communication with the auxiliary fuel tank via at least one of the one or more fuel lines, the auxiliary return valve having an open position and a closed position,
wherein the auxiliary return valve in the open position allows excess primary fuel that was delivered to the piston cylinder injection nozzle to return to the auxiliary fuel tank,
wherein the auxiliary return valve in the closed position disallows excess primary fuel that was delivered to the piston cylinder injection nozzle from returning to the auxiliary fuel tank.

14. The system of claim 13, wherein the flow management device includes a mechanical user input, the mechanical user input operable by a user to receive the first indication or the second indication and open or close the auxiliary diversion valve and the auxiliary return valve to control fuel flow in the flow management device.

15. The system of claim 10, further comprising:
an air compression device in the air intake path, wherein the auxiliary injection nozzle is configured to inject the auxiliary fuel into the air intake path downstream of the air compression device and upstream of an intake manifold, wherein the primary fuel comprises at least one of diesel or gasoline, and the auxiliary fuel comprises an ethanol and water mixture between 130 and 190 proof ethanol.

16. A method of delivering fuel to an engine, the method comprising:
delivering a primary fuel from a primary tank to a piston cylinder injection nozzle to provide the primary fuel to a piston cylinder of an engine;
preventing the primary fuel in the primary tank from being delivered to an auxiliary injection nozzle configured to inject an auxiliary fuel into an air intake path upstream of the piston cylinder injection nozzle; and
receiving at a flow management device, a first indication that an auxiliary tank stores the primary fuel or a second indication that the auxiliary tank stores the auxiliary fuel, and based on the indication:
delivering, upon receiving the first indication, the primary fuel from the auxiliary tank to the piston cylinder injection nozzle, preventing delivery of the primary fuel to an auxiliary injection nozzle in fluid communication with an air intake upstream of a piston cylinder injection nozzle, and allowing excess primary fuel that was delivered to the piston cylinder injection nozzle to return to the auxiliary tank, or
delivering, upon receiving the second indication, the auxiliary fuel from the auxiliary tank to the auxiliary injection nozzle and preventing delivery of the auxiliary fuel to the piston cylinder injection nozzle; and
preventing mixing of the auxiliary fuel with the primary fuel in the primary tank.

17. The method of claim 16, further comprising:
returning excess primary fuel to the primary tank;
disallowing return of the primary fuel to the auxiliary tank; and
disallowing return of the auxiliary fuel to the primary tank or auxiliary tank.

18. The method of claim 16, wherein delivering the auxiliary fuel from the auxiliary tank to the auxiliary injection nozzle includes delivering the auxiliary fuel into the air intake path downstream of an air compression device and upstream of an intake manifold, wherein the auxiliary fuel comprises an ethanol and water mixture between 130 and 190 proof ethanol, and wherein the primary fuel comprises at least one of diesel or gasoline.

19. The method of claim 16, wherein receiving the first indication or the second indication includes receiving an input from a user, wherein receiving the first indication is caused by the user opening an auxiliary diversion valve to allow fluid communication between the auxiliary tank and the piston cylinder injection nozzle, and wherein receiving the second indication is caused by the user closing an auxiliary diversion valve to divert fluid communication to occur between the auxiliary tank and the auxiliary injection nozzle, and closing an auxiliary return valve to divert primary fuel from being returned to the auxiliary tank.

20. The system of claim 10, wherein the auxiliary fuel comprises an ethanol and water mixture.

21. The method of claim 16, wherein the auxiliary fuel comprises an ethanol and water mixture.

22. A method of delivering fuel to a diesel engine, the method comprising:
delivering a primary fuel including diesel fuel from a primary tank to a piston cylinder injection nozzle to provide the primary fuel to a piston cylinder of the diesel engine, wherein the primary fuel provides a majority of the energy to the diesel engine;
preventing the primary fuel in the primary tank from being delivered to an auxiliary injection nozzle, wherein the auxiliary injection nozzle is configured to inject an auxiliary fuel comprising a 130-190 proof fuel and water mixture into an air intake path upstream of the piston cylinder injection nozzle to provide a smaller portion of the energy to operate the diesel engine than the energy provided by the primary fuel; and
receiving a user input at a flow management device, the user input including a first indication that an auxiliary tank stores the primary fuel or a second indication that the auxiliary tank stores the auxiliary fuel, and based on the indication:
delivering, upon receiving the first indication, the primary fuel from the auxiliary tank to the piston cylinder injection nozzle, preventing delivery of the primary fuel to the auxiliary injection nozzle in fluid communication with an air intake upstream of a piston cylinder injection nozzle, and allowing excess primary fuel that was delivered to the piston cylinder injection nozzle to return to the auxiliary tank, and delivering, upon receiving the second indication, the auxiliary fuel from the auxiliary tank to the auxiliary injection nozzle and preventing delivery of the auxiliary fuel to the piston cylinder injection nozzle;

returning excess primary fuel to the primary tank;

disallowing return of the primary fuel to the auxiliary tank; and disallowing return of the auxiliary fuel to the primary tank to prevent mixing of the auxiliary fuel with the primary fuel in the primary tank.

* * * * *